United States Patent [19]

Muto et al.

[11] 4,252,053
[45] Feb. 24, 1981

[54] AIR OUTLET DEVICE FOR A VEHICLE WITH AN AIR CONDITIONER

[75] Inventors: Eiki Muto, Yokohama; Toshio Ohashi, Yokosuka, both of Japan

[73] Assignee: Nissan Motor Company, Limited, Yokohama, Japan

[21] Appl. No.: 27,095

[22] Filed: Apr. 4, 1979

[30] Foreign Application Priority Data

Apr. 11, 1978 [JP] Japan .............................. 53/47923[U]

[51] Int. Cl.³ .............................................. B60H 1/26
[52] U.S. Cl. .................................. 98/2.15; 98/40 C; 98/40 D
[58] Field of Search .................. 98/2, 2.11, 2.14, 2.15, 98/40 C, 40 D

[56] References Cited

U.S. PATENT DOCUMENTS

| | | | |
|---|---|---|---|
| 1,592,718 | 7/1926 | Browne | 98/40 C |
| 2,087,651 | 7/1937 | Mygland | 98/2.15 |
| 2,171,622 | 9/1939 | Calkins | 98/2.15 |
| 2,200,992 | 5/1940 | Litern | 98/2.15 |
| 2,319,002 | 5/1943 | Kramer | 98/2.15 |
| 3,631,788 | 1/1972 | Larkfeldt | 98/40 D |
| 4,048,910 | 9/1977 | Weir | 98/2.11 |

*Primary Examiner*—Henry G. Yuen

[57] ABSTRACT

An air outlet device in a vehicle with an air conditioner comprises a duct which is disposed at the ceiling of the passenger compartment of the vehicle and communicates with the air conditioner. The duct is provided with a first set of air outlets and a second set of air outlets which are located downstream of the first set of air outlets. Within the duct, flow restriction means is disposed at a position downstream of the first set of air outlets and at the same time upstream of the second set of air outlets for restricting the flow rate of air admitted to the second set of air outlets. The first set of air outlets are adjustable to blow toward or away from a passenger of the vehicle. The second set of air outlets are fixed to blow in one direction and adapted to effect mild recirculation of air throughout the passenger compartment.

1 Claim, 12 Drawing Figures

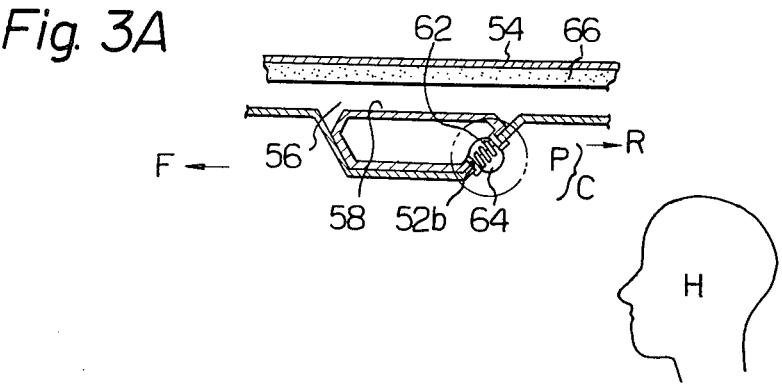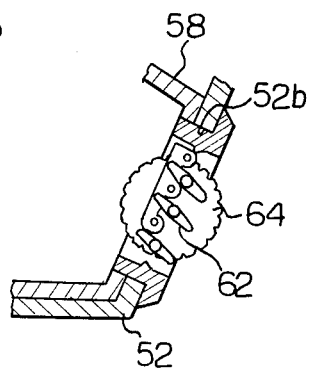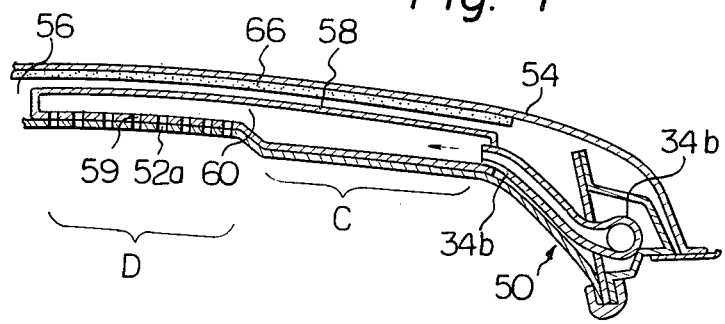

AIR OUTLET DEVICE FOR A VEHICLE WITH AN AIR CONDITIONER

BACKGROUND OF THE INVENTION

This invention relates in general to vehicles equipped with air conditioners and more particularly to air outlet devices in such vehicles for admitting the air conditioned by the air conditioners to the passenger compartment of the vehicle.

OBJECTS OF THE INVENTION

A primary object of the present invention is to provide a novel and improved air outlet device for a vehicle having an air conditioner by which the air conditioned by the air conditioner can be supplied to the passenger compartment under comfortable conditions.

Another object of the present invention is to provide a novel and improved air outlet device of the above mentioned character which is adapted so that mild recirculation of air throughout the passenger compartment and air discharge toward a localized part of the passenger compartment can be achieved at the same time.

BRIEF DESCRIPTION OF THE DRAWINGS

These and other objects and advantages of the present invention will be apparent from the ensuing description with reference to the accompanying drawings, in which:

FIG. 3A is a fragmentary sectional view taken generally along the line III—III of FIG. 2;

FIG. 3B is an enlarged view of the part "P" of FIG. 3A;

FIG. 4 is a fragmentary sectional view taken generally along the line IV—IV of FIG. 2;

DETAILED DESCRIPTION OF THE PREFERRED EMBODIMENTS

Figure 1:
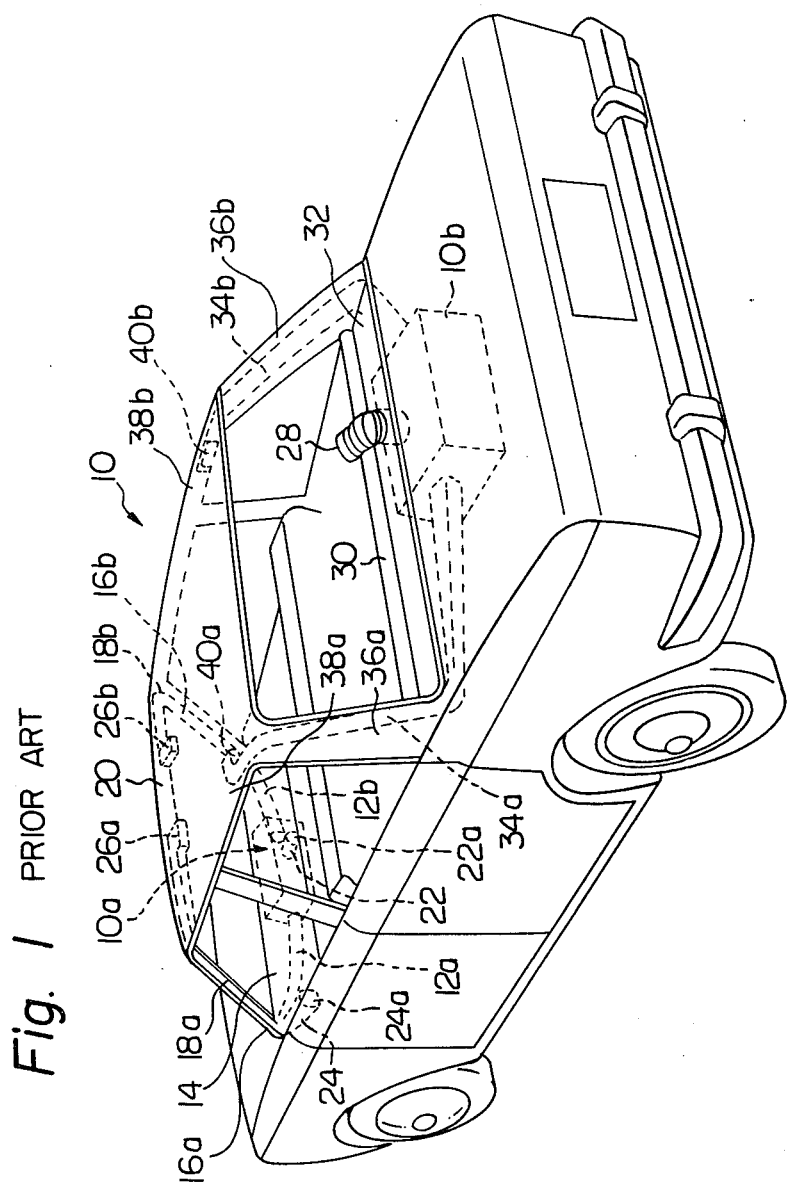
FIG. 1 is a perspective view of a vehicle fitted with an air conditioner, showing a conventional air outlet device to which reference is made for comparison with the air outlet device according to the present invention in terms of structural and operational differences.

Referring to FIG. 1, description is first made of a conventional air outlet device for a vehicle having an air conditioner for the convenience of understanding in inventive step of the present invention.

The conventional air outlet device is shown of the type for use in conjunction with an air conditioner 10 having two air conditioning or ventilation units 10a and 10b. The air conditioning unit 10a is provided for supplying conditioned air mainly to the front seat part of the passenger compartment while the air conditioning unit 10b is provided mainly for the rear seat part.

For supply of conditioned air mainly to the front seat part of the passenger compartment, the conventional air outlet device includes ducts 12a and 12b which are respectively connected at their inner ends to the air conditioning unit 10a. The air conditioning unit 10a is mounted in the front part of the vehicle. The ducts 12a and 12b extend laterally outwardly along an instrument panel 14 to connect with ducts 16a and 16b, respectively. The ducts 16a and 16b are arranged to extend along front pillars 18a and 18b, respectively and further along a front roof rail 20. Designated by reference numeral 22 is a center duct connected to the air conditioning unit 10a and by 24 a side duct branched off from the duct 12a near the outer end thereof. The center duct 22 and the side duct 24 are respectively provided with air outlets 22a and 24a, and the ducts 16a and 16b are provided with air outlets 26a and 26b located near the forward end of the ceiling of the passenger compartment, respectively. With this arrangement, the air emitted from the air conditioning unit 10a is carried by the ducts 12a, 12b, 16a, 16b, 22 and 24 and supplied to the front seat part of the passenger compartment through the outlets 22a, 24a, 26a and 26b.

For the supply of conditioned air mainly to the rear seat part of the passenger compartment, the conventional air outlet devices further includes an air outlet 28 which communicates with the air conditioning unit 10b. The air conditioning unit 10b is disposed behind the the rear seat 30, and the air outlet 28 is disposed on a rear shelf 32. To the air conditioning unit 10b are futher connected ducts 34a and 34b at one ends thereof, respectively. The ducts 34a and 34b are arranged along rear quarter panels 36a and 36b and extend toward the other ends thereof located at side roof rails 38a and 38b. The ducts 34a and 34b are provided, at the other ends thereof, with air outlets 40a and 40b, respectively. With this arrangement, the air emitted from the air conditioning unit 10b is supplied to the rear seat part of the passenger compartment through the air outlets 28, 40a and 40b.

The air outlets of the conventional air outlet device of the type thus described are each constructed to be used for both circulation of air throughout the passenger compartment and discharge of air toward a localized part of the passenger compartment. For optimal comfort of the passengers of the vehicle, such an air outlet device is desirable that can effect both mild recirculation of air throughout the passenger compartment and discharge of air toward a localized part of the passenger compartment at the same time. With the conventional air outlet device, however, mild recirculation of air throughout the passenger compartment and discharge of air toward a localized part of the passenger compartment cannot be achieved at the same time.

With a view to the above fact, a new and improved air outlet device for a vehicle having an air conditioner is provided according to the present invention.

A preferred embodiment of this invention will now be described with reference to FIGS. 2 through 5, in which like parts to those of FIG. 1 are given like reference numerals and will not be described again for brevity.

Figure 2:
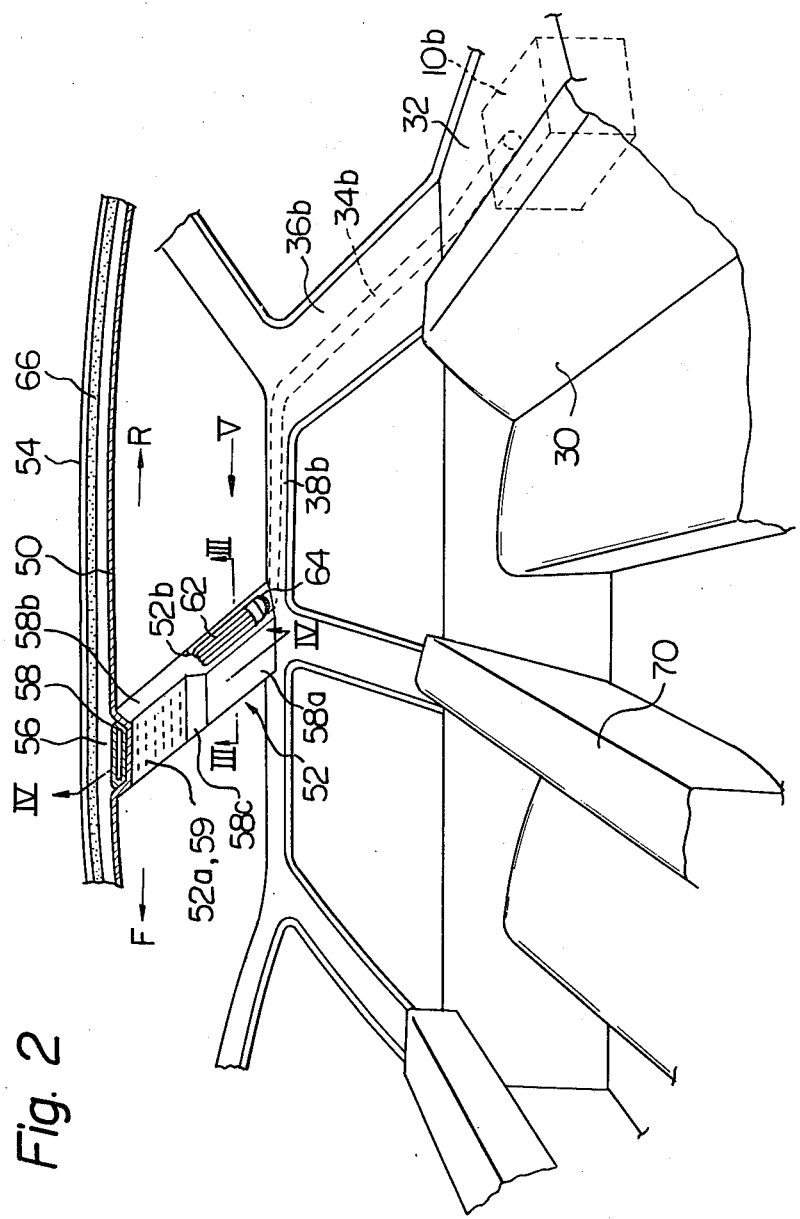
FIG. 2 is a perspective view of a vehicle, partly in section and partly cutaway, showing an air outlet device embodying the present invention.
Figure 5:
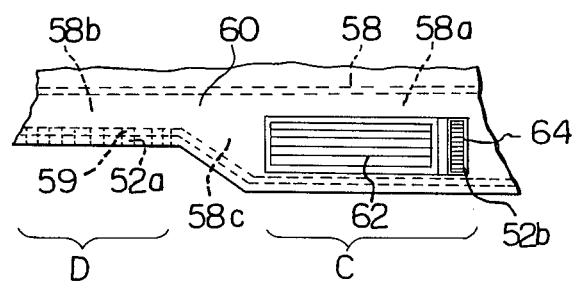
FIG. 5 is a fragmentary perspective view taken in the direction of arrow "V" of FIG. 2.

Referring particularly to FIG. 2, designated by reference numeral 50 is a roof trim or an inner ceiling panel of a passenger compartment. The ceiling panel 50 is formed with a transverse projecting band or bead 52 which extends transversely of the passenger compartment so as to divide the ceiling thereof into front and rear parts which conform to the tops of the front and rear seat parts of the passenger compartment. In other words, the bead 52 is arranged at the junction of the front seat part and the rear seat part of the passage compartment. The transverse bead 52 of the ceiling panel 50 cooperates with an outer roof panel 54 to define therebetween a space 56. In this space 56 is disposed a duct 58 having an inner closed axial end and an outer open axial end which is communicated with an air conditioning or ventilation unit 10b through a duct 34b. The duct 58 is fixed to the ceiling panel 50 in a suitable manner such as by an adhesive or the like.

The duct 58 has a first set of air outlets C which are adjustable to blow in a multiplicity of directions slanting with respect to the floor of the passenger compartment and a second set of air outlets D which are located downstream of the first set of air outlets C and fixed to blow in one direction substantially perpendicular to the floor of the passenger compartment and comprised of a plurality of slits or small holes 59. The duct 58 is further constructed so that its first duct section 58a, where the first set of air outlets C are provided, has a cross sectional passage area which is larger than that of the second duct sections 58b where the second set of air outlets D are provided. With this variation in passage area, the duct 58 is adapted to include flow restriction means 60, constituted by the transition section 58c connecting the first and second duct sections 58a and 58b, for restricting the flow rate of air admitted to the second set of air outlets D below a predetermined value. Thus, the flow restriction means 60 are disposed within the duct 58 at a position downstream of the first set of air outlets C and at the same time upstream of the second set of air outlets D.

The transverse bead 52 of the ceiling panel 50 is formed with a plurality of apertures 52a so that the second set of air outlets D open into the passenger compartment without being obstructed by the ceiling panel 50. The first set of air outlets C are constructed to be adjustable by the arrangement of louvers 62 which are adjustable by rotating a control dial 64. For this arrangement, the transverse bead 52 is further formed with an aperture 52b. Designated by reference numeral 66 is a layer of soft resilient material which is attached to the roof panel 54 by an adhesive.

The structure of the air outlet device thus described relates to the right half part thereof when viewed from the rear of the vehicle. The air outlet device is symmetrical with respect to the center axis of the vehicle and, in effect, has the left half part thereof including another duct (not shown) which is constructed and arranged in a similar manner to the duct 58 thus described and shown.

The operation of the air outlet device for a vehicle having an air conditioner thus constructed according to the present invention will now be described.

When it is desired to supply conditioned air from the air conditioner 10b to the passenger compartment of the vehicle, a control switch (not shown) disposed in a suitable place within the passenger compartment is turned ON to permit the air conditioning unit 10b to start emitting conditioned air under pressure into the duct 34b. The air emitted into the duct 34b is carried therethrough to the duct 58.

As shown in FIG. 3A, the first set of air outlets C are positioned slantwise above the head H of a passenger in the rear seat 30 and the control dial 64 is positioned within reach of the hand of the passenger who is sitting in the rear seat 30. By rotating the control dial 64 thereby moving the louvers 62, the air discharge direction from the first set of air outlets C can be varied, that is, the first set of air outlets C can be adjusted to blow toward or away from the passenger in the rear seat 30. The flow rate of the air discharged from the first set of air outlets C can also be controlled by rotating the control dial 64. The louvers 62 are further adjustable to shut off, thereby cutting the supply of air from the first set of air outlets C to the passenger compartment.

During the time when the air conditioning unit 10b is in operation, the second set of air outlets D is kept blowing gently due to the effect of the flow restriction means 60 and the flow resistance provided by the relatively small air outlet holes 59 whereby mild recirculation of air throughout the passenger compartment is obtained.

When it is desired for the first set of air outlets C to stop blowing toward the passenger in the rear seat, the control dial 64 is operated so as to shut off the first set of air outlets C thereby cutting off the discharge of air therefrom. When the first set of air outlets C are shut off, the flow rate of air discharged from the second set of air outlets D increases. However, due to the effect of the flow restriction means 60 and the flow resistance provided by the relatively small air outlet holes 59, the flow rate of discharge air from the second set of air outlets D is restricted below a relatively small value so that mild recirculation of air throughout the passenger compartment can be effected. The second set of air outlets D are adapted so that the air discharge therefrom may be circulated throughout the passenger compartment quite gently and naturally, whereas the first set of air outlets C are adapted so as to blow relatively forcefully toward a localized part of the passenger compartment. When it is desired to stop supplying air from the air conditioning unit 10b to the passenger compartment, the aforementioned control switch is turned OFF so as to stop the operation of the air conditioning unit 10b.

Figure 6A:
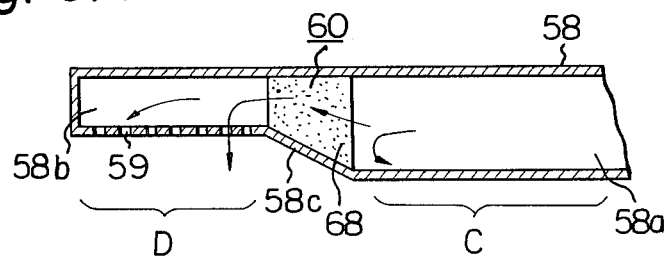
FIGS. 6A through 8C are fragmentary sectional views showing various modifications of the air outlet device of FIG. 2.

Referring to FIG. 6A, a modification of the preceding embodiment of this invention will be described. The embodiment of FIG. 6A differs from the embodiment of FIG. 2 in the additional provision of a permeable or porous member such as an urethane filter. The permeable member 68 is disposed in the transition duct section 58c to constitute a part of flow restriction means 60.

Figure 6B:
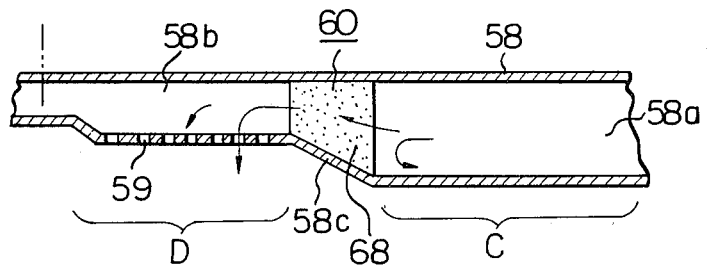

FIG. 6B shows another modification of the preceding embodiment of FIG. 2. In this modified embodiment, the left and right ducts 58 communicate with each other at their second duct sections 58b where the second set of air outlets D are provided.

Figure 7:
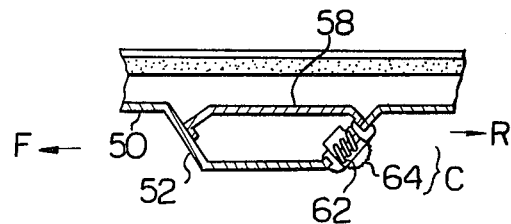

FIG. 7 shows a further modification of the preceding embodiment of FIG. 2. In this modified embodiment of FIG. 7, the duct 58 is made of upper and lower half parts, of which lower half part is formed by the transverse bead 52 of the ceiling panel 50. As FIG. 7 shows, in cross section, the first duct section 58a where the first set of air outlets C are provided, the second set of air outlets D, which are in effect formed in the transverse bead 52 of the ceiling panel 50, are not shown.

Figure 8A:
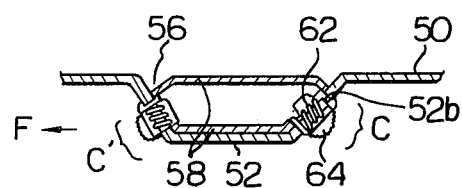

FIG. 8A shows a still futher embodiment of the preceding embodiment of FIG. 2. In this embodiment of FIG. 8A, a third set of air outlets C' are provided in the front side part of the duct 58 in addition to the first set of air outlets C provided in the rear side part of the duct 58. The third set of air outlets C' are substantially similar to the first set of air outlets C with the exception that the third set of air outlets C' are adapted for blowing toward or away from a passenger in the front seat 70 of the vehicle.

Figure 8B:
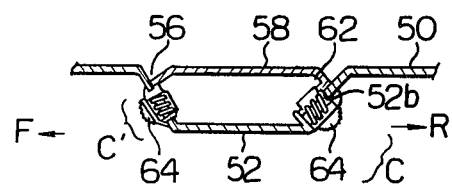

FIG. 8B shows a still further modification of the preceding embodiment of FIG. 2. This modified embodiment of FIG. 8B is substantially similar to that of FIG. 8A except that the duct 58 is made of upper and lower half parts of which lower half part is formed by the transverse bead 52 of the ceiling panel 50.

Figure 8C:
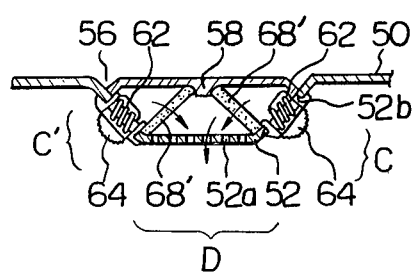

FIG. 8C shows a still further modification of the preceding embodiment of FIG. 2. This modified embodiment of FIG. 8C is substantially similar to that of FIG. 8B except that the second set of air outlets D are formed so as to correspond in lengthwise position on the transverse bead 52 to the first and third sets of air outlets C and C' and that permeable members 66' are arranged so that the air from the air conditioning unit 10b is admitted to the second set of air outlets D only through the permeable member 66' which constitute flow restriction means 60.

From the foregoing description, it will be understood that the air outlet device of this invention is optimally constructed to effect both mild recirculation of air throughout a passenger compartment of a vehicle and relatively forceful discharge of air toward or away from a passenger of the vehicle at the same time.

Furthermore, it is to be noted that the bead 52 of the ceiling panel 50, which is arranged at the junction of the front seat part and the rear seat part of the passenger compartment, effects as if the front seat part and the rear seat part of the passenger compartment were separated from each other.

What is claimed is:

1. An air outlet device in a vehicle having a passenger compartment and an air conditioner comprising:

a duct disposed at the ceiling of said passenger compartment in a manner to extend transversely thereof and communicating with said air conditioner;

said duct having a first set of air outlets which are adjustable to blow in a multiplicity of directions slanting with respect to the floor of the passenger compartment and a second set of air outlets which are located downstream of said first set of air outlets and fixed to blow in one direction substantially perpendicular to the floor of the passenger compartment;

flow restriction means disposed within said duct at a position downstream of said first set of air outlets and at the same time upstream of said second set of air outlets for restricting the flow rate of air admitted to said second set of air outlets below a predetermined value;

in which the ceiling of said passenger compartment is defined by a wall including an outlet roof panel and an inner ceiling panel having a bead extending transversely of said passenger compartment;

in which said duct is disposed in a space formed between said roof panel and said bead of the ceiling panel;

in which said passenger compartment includes a front seat part and a rear seat part;

in which said first set of air outlets are constructed to blow mainly toward said rear seat part of the passenger compartment; and in which said duct further includes a third set of air outlets which are adjustable to blow in a multiplicity of directions slanting with respect to the flow of the passenger compartment and which are arranged upstream of said flow restriction means, said third set of air outlets being constructed to blow mainly toward said front seat part of the passenger compartment.

* * * * *